(12) United States Patent
Levitan

(10) Patent No.: US 7,336,962 B2
(45) Date of Patent: Feb. 26, 2008

(54) SYSTEM AND METHOD FOR POSITION EQUIPMENT DUSTING IN SEARCH AND RESCUE OPERATIONS

(75) Inventor: Benjamin Charles Levitan, Raleigh, NC (US)

(73) Assignee: Nextel Communications Inc., Overland Park, KS (US)

( * ) Notice: Subject to any disclaimer, the term of this patent is extended or adjusted under 35 U.S.C. 154(b) by 87 days.

(21) Appl. No.: 11/156,506

(22) Filed: Jun. 17, 2005

(65) Prior Publication Data

US 2006/0293023 A1     Dec. 28, 2006

(51) Int. Cl.
*H04Q 7/20* (2006.01)
*H04Q 7/32* (2006.01)
(52) U.S. Cl. .............................. 455/456.1; 455/404.1; 455/404.2; 455/521; 455/422.1; 455/456.3; 455/90.1; 455/90.3; 340/573.4; 340/825.49; 379/45; 379/49
(58) Field of Classification Search ............ 455/404.1, 455/404.2, 521, 403, 456.1, 456.2, 456.3, 455/456.4, 456.5, 456.6, 457, 500, 517, 575.1, 455/90.3, 90.1, 90.2; 340/539, 568.1, 573.4, 340/7.5, 825.49; 379/45, 49
See application file for complete search history.

(56) References Cited

U.S. PATENT DOCUMENTS

2001/0034223 A1* 10/2001 Rieser et al. ................ 455/404

2003/0220092 A1* 11/2003 Hethuin et al. .......... 455/404.2
2004/0029558 A1*  2/2004 Liu ........................ 455/404.2

FOREIGN PATENT DOCUMENTS

WO    WO2004027446    *  4/2007

* cited by examiner

*Primary Examiner*—Keith Ferguson

(57) ABSTRACT

A wireless communication system useful in locating users of mobile communication units (MUs) in emergency situations. In one embodiment, the system includes a plurality of aircraft-deployable, wireless position determining equipment (PDE) to generate position information from an emergency call request received from an MU, and a wireless mobile positioning center (MPC) on board an aircraft adapted to determine the location of the MU from the position information received from the PDE. In another embodiment, the PDE are adapted to transmit a message to elicit a response from the MU to acquire position information. In another embodiment, the PDE are adapted to receive periodic messages from the MU to acquire position information. In another embodiment, a mobile switching center (MSC) assists a GPS-capable MU in determining its location by providing it the information on the GPS satellites visible within the area covered by its base station and sector.

31 Claims, 11 Drawing Sheets

SYSTEM AND METHOD FOR POSITION EQUIPMENT DUSTING IN SEARCH AND RESCUE OPERATIONS

CROSS-REFERENCE OF RELATED APPLICATIONS

This application claims the benefit of the filing date of Provisional Application, entitled "System and Method for Locating Mobile Communication Units," filed on Jun. 15, 2005, which is incorporated herein by reference. This application is also related to Non-Provisional Application, entitled "System and Method for Determining a Location of an Emergency Call in a Sparsely-Populated Area," filed on Jun. 17, 2005."

FIELD OF THE INVENTION

This invention relates generally to wireless communication systems, and in particular, to a system and method for determining a location of an emergency call in a sparsely-populated area.

BACKGROUND OF THE INVENTION

In an emergency situation, a person in distress typically calls a pre-determined telephone number (e.g., 911 in the United States) to obtain assistance with the emergency from a public safety agency (e.g., law enforcement, fire department, medical unit, animal control, etc.). An emergency call dispatcher located in a public safety answer point (PSAP) facility typically receives the emergency telephone call and subsequently contacts the appropriate public safety agency or agencies to assist in the emergency situation.

In addition to receiving the emergency call, the dispatcher receives by way of a computer console information related to the call. For example, such information may include the telephone number of the telephone from which the emergency call was made, the address from where the call was placed if the call originated from a land line telephone, person's name associated with the telephone, etc. The dispatcher uses this information to assist the public safety agency or agencies in providing the emergency assistance.

When an emergency call originates from a wireless telephone (e.g., a cellular telephone), information related to the location of the wireless telephone needs to be provided to the emergency call dispatcher. In some cases, the wireless telephone includes a global positioning system (GPS) receiver to determine the location of the telephone. Such telephone provides the GPS-derived location to the dispatcher when an emergency call is made. The GPS technique, however, does have some drawbacks. For instance, the GPS receiver requires time to "warm up", and often takes a relatively long time to determine the location of the caller. Also, there are a number of environments where the GPS receiver is not capable of determining the location of the caller due to, for example, obstructions and/or lack of receiving sufficient number of the GPS satellite signals.

In cases where the wireless telephone does not have GPS capability, the location information must be derived by other techniques. One such technique is employing a triangulation location algorithm using timing information related to when a wireless telephone signal is received at three or more base stations. This technique works for any wireless telephones including those that have GPS receivers and those that do not. The following example illustrates the triangulation technique.

FIG. 1 illustrates a block diagram of an exemplary wireless communication system 100 comprising a carrier network 102 having a mobile switching center (MSC) 104 and other network equipment (not shown), a mobile positioning center (MPC) 106, a plurality of base stations (BS) 108, 110, and 112 located in a densely-populated geographical area 114, and another plurality of base stations (BS) 130 and 132 located in a sparsely-populated geographical area 134. The base stations (BS) 108, 110, 112, 130, and 132 respectively include position determining equipment (PDE) 116, 118, 120, 136, and 138. In this example, the wireless communication system 100 provides wireless communication services to a mobile communication unit (MU) 122 (e.g., a cellular telephone) located in the densely-populated area 114, and to an MU 140 located in the sparsely-populated area 134. In an emergency call situation, the MSC 104 connects an MU to a public safety answer point (PSAP) 150 to assist the caller with the on-going emergency.

In order to provide the PSAP 150 information related to the location of the calling MU in an emergency situation, the wireless communication system 100 uses triangulation of the signal received in at least three (3) base stations (BS). In this regard, each of the base stations (BS) uses the corresponding PDE to time stamp the signal it receives from the calling MU. Each PDE sends the time stamp information to the MPC 106 by way of the MSC 104. The MPC 106 uses the time stamp information to determine the approximate location of the calling MU.

As an example, in the densely-populated area 114, the person using MU 122 initiates an emergency call. In response, the MU 122 sends an emergency call request to the MSC 104 by way of its assigned base station (BS). In this example, the assigned base station is base station (BS) 108. The emergency call request is subsequently processed by the MSC 104 to establish a voice communication link between the MU 122 and the PSAP 150. When the assigned base station (BS) 108 initially receives the emergency call request, the corresponding PDE 116 time stamps the request with a time of $t_1$. Although the other base stations (BS) 110 and 112 are not currently assigned to handle calls for MU 122, they still receive the broadcast containing the emergency call request at different times $t_2$ and $t_3$ (because they are at different distances from the MU 122), which are time stamped by the corresponding PDEs 118 and 120.

The PDEs 116, 118, and 120 send the time stamp information ($t_1$, $t_2$, $t_3$) to the MPC 106 by way of the MSC 104. Using a triangulation algorithm, the MPC 106 determines the approximate location of the MU 122 using the time stamp information ($t_1$, $t_2$, $t_3$). The MPC 106 then sends the location information to the PSAP 150. The MPC 106 needs at least three (3) time stamps to perform the triangulation in order to accurately determine the approximate location of the calling MU. If the MPC 106 receives less than three (3) time stamps, it cannot accurately determine the approximate location of the calling MU. This presents a problem for a sparsely-populated area.

In a sparsely-populated area, there are typically less base stations (BS) per a given area than in a densely-populated area. As a result, there may not exist the required number of base stations (BS) to receive a signal from an MU in order to perform a triangulation to determine the approximate location of the calling MU. For example, in the sparsely-populated area 134, there are only two (2) base stations (BS) 130 and 132. Accordingly, when the MU 140 sends an emergency call request, the corresponding PDEs 136 and 138 in the respective base stations 130 and 132 can only time stamp the request with times $t_4$ and $t_5$, respectively. The PDEs 136 and 138 send the time stamp information $t_4$ and $t_5$ to the MPC 106 by way of the MSC 104. However, in this example, the MPC 106 does not receive the minimum number of time stamp information to perform a triangulation in order to accurately locate the calling MU 140.

SUMMARY OF THE INVENTION

An aspect of the invention relates to a wireless communication system characterized in the sharing of PDE resources by two or more different wireless communication carriers in order to provide effective triangulation for locating emergency-calling mobile units (MUs) in a sparsely-populated area. In particular, the wireless communication system comprises one or more first position determining equipment (PDE) associated with a first wireless communication carrier, one or more second PDEs associated with a second wireless communication carrier, and a mobile positioning center (MPC) adapted to determine an approximate location information of an emergency-calling MU using time stamp information received from the first and second PDEs. The different carriers may also share the MPC, or have their own respective MPCs. Other features, elements and methods related to this wireless communication system are further disclosed herein.

Another aspect of the invention relates to a wireless communication system characterized in the addition of one or more standalone PDEs (i.e., not associated with a base station) to provide effective triangulation for locating emergency-calling MUs in a sparsely-populated area. In particular, the wireless communication system comprises a plurality of PDEs, wherein one or more of the PDEs comprise a standalone PDE; and an MPC to determine an approximate location of emergency-calling MUs using time stamp information received from the PDEs. In one embodiment, the wireless communication system includes one or more PDEs associated with respective base stations (BS), and one or more standalone PDEs. In another embodiment, the wireless communication system only includes standalone PDEs in the sparsely-populated area. In yet another embodiment, the MPC and PDEs are operated by a third party and the voice communication equipment by a wireless communication carrier. Other features, elements and methods related to this wireless communication system are further disclosed herein.

Another aspect of the invention relates to a wireless communication system characterized in a system including base stations (BS) limited to establishing voice communication links between emergency-calling MUs and a PSAP, and equipment for locating emergency-calling MUs. In particular, the wireless communication system comprises a plurality of base stations (BS) each restricted to processing only emergency call requests received from emergency-calling MUs for establishing respective voice communication links between the emergency-calling MUs and a public safety answer point (PSAP); an MSC to establish the voice communication links in response to receiving respective emergency call requests from one or more of the base stations; a plurality of PDEs adapted to time stamp emergency call requests received respectively by way of the plurality of base stations; and an MPC to determine approximate location information of emergency-calling MUs using time stamp information received from the PDEs, and to send the approximate location information to a PSAP. Other features, elements and methods related to this wireless communication system are further disclosed herein.

Another aspect of the invention relates to a wireless communication system deployable in a search and rescue area to locate and assist a lost party with an MU. In particular, the wireless communication system comprises a plurality of PDEs to generate time stamp information associated with a received emergency call request from an emergency-calling MU, and transmit the time stamp information via a wireless medium; and an MPC adapted to receive the time stamp information from the plurality of PDEs by way of the wireless medium, and determine an approximate location of the emergency-calling MU from the time stamp information. Other features, elements and methods related to this wireless communication system are further disclosed herein.

Another aspect of the invention relates to a position determining equipment, comprising an antenna; a radio frequency (RF) interface coupled to the antenna; and a time stamp module adapted to generate time information associated with a receipt of an emergency call request from an emergency-calling MU by way of the antenna and the RF interface. Other features, elements and methods related to this wireless communication system are further disclosed herein.

Another aspect of the invention relates to a mobile positioning center (MPC), comprising an antenna; a radio frequency (RF) interface coupled to the antenna; and a processor adapted to receive time information associated with a receipt of an emergency call request by a position determining equipment (PDE) from an emergency-calling MU by way of the antenna and the RF interface, and to determine an approximate location information of the emergency-calling MU. Other features, elements and methods related to this wireless communication system are further disclosed herein.

Another aspect of the invention relates to a wireless communication system, comprising a plurality of position determining equipment (PDE) wherein at least one of the position determining equipment (PDE) is adapted to transmit a message (e.g., a paging message, re-registration message, etc.) adapted to elicit a response from a mobile unit (MU); and wherein each of the positioning determining equipment (PDE) is adapted to receive a response from the mobile unit (MU); generate information (e.g., time stamp information) related to the response from the mobile unit (MU); and transmit the information. The wireless communication system further includes a mobile positioning center adapted to receive the information from the position determining equipment (PDE), and determine an approximate location of the mobile unit (MU) using the information.

Another aspect of the invention relates to a wireless communication system, comprising a plurality of position determining equipment (PDE) wherein each of the positioning determining equipment (PDE) is adapted to receive periodic messages (e.g., periodic registration requests) from a mobile unit (MU); generate information (e.g., time stamp information) related to at least one of the periodic messages from the mobile unit (MU); and transmit the information. The wireless communication system further includes a mobile positioning center adapted to receive the information from the position determining equipment (PDE), and determine an approximate location of the mobile unit (MU) using the information.

Another aspect of the invention relates to a wireless communication system comprising a plurality of base stations; and a mobile switching center (MSC) adapted to receive an emergency call request from a mobile unit (MU) by way of one of the plurality of base stations; establish a voice communication link between the mobile unit and a public safety answer point (PSAP); determine from which base station and/or sector the emergency call request was received; and send information related to a set of GPS satellites associated with the base station and/or sector to the mobile unit by way of the base station. The mobile unit uses the information to faster determine its present location, and subsequently sends its present location information to the public safety answer point (PSAP) by way of the mobile switching center (MSC).

Other aspects, features, and techniques of the invention will be apparent to one skilled in the relevant art in view of the following detailed description of the exemplary embodiments of the invention.

DETAILED DESCRIPTION OF THE EXEMPLARY EMBODIMENTS

Figure 1:
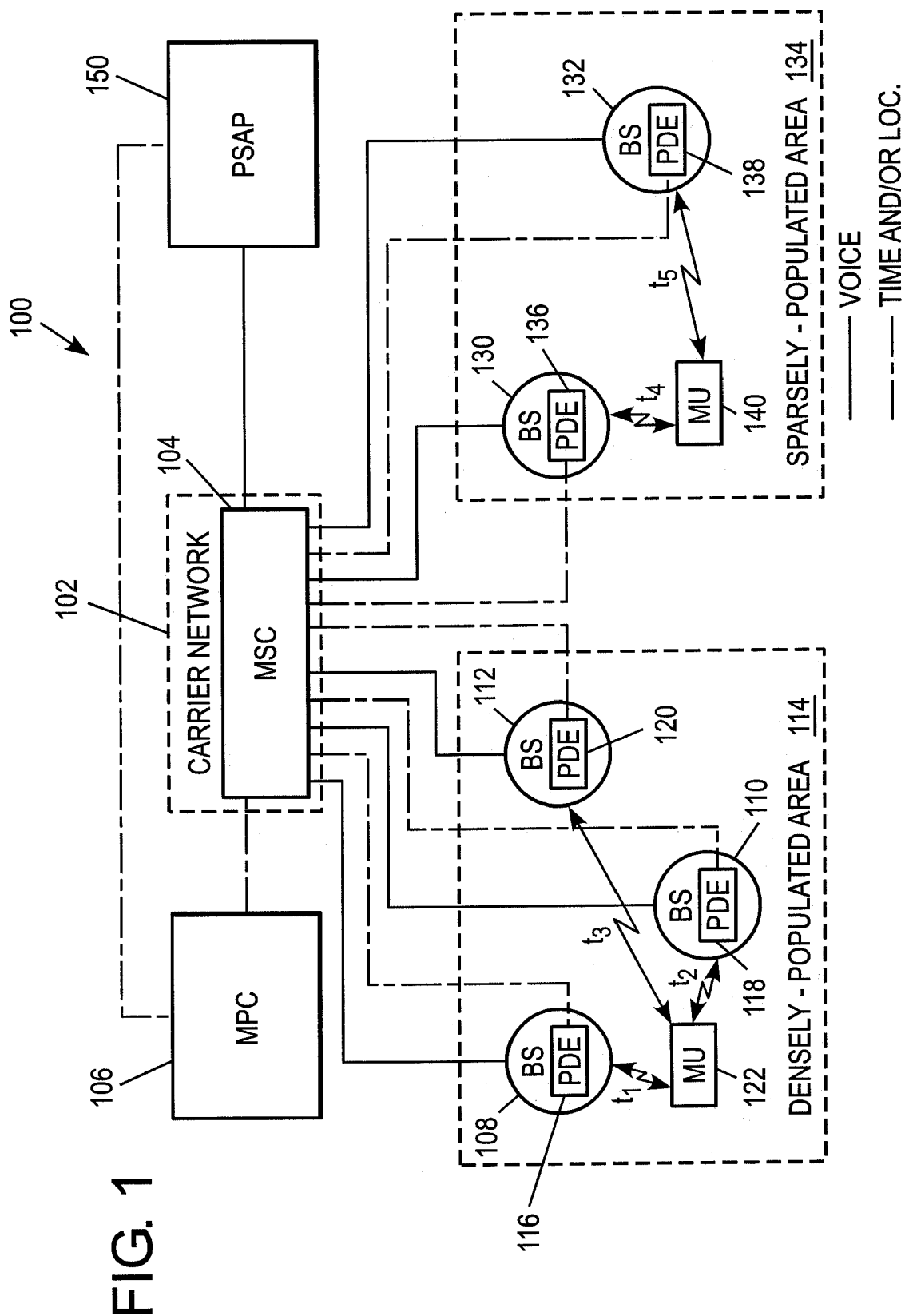
FIG. 1 illustrates a block diagram of an exemplary wireless communication system.
Figure 2:
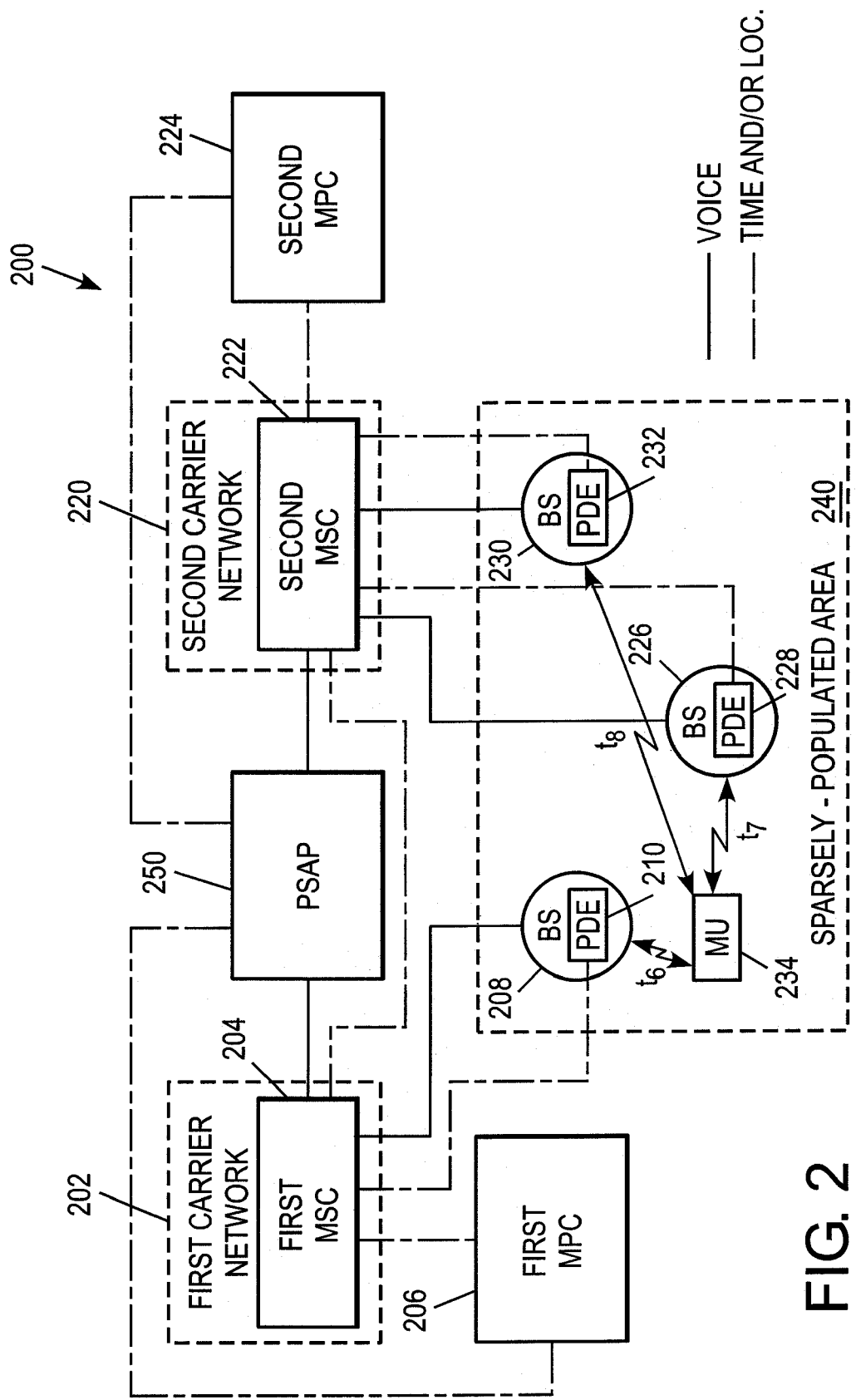
FIG. 2 illustrates a block diagram of an exemplary wireless communication system in accordance with an embodiment of the invention.

FIG. 2 illustrates a block diagram of an exemplary wireless communication system 200 in accordance with an embodiment of the invention. In summary, the wireless communication system 200 is characterized in the sharing of PDE resources by two or more different wireless communication carriers in order to provide effective triangulation for locating emergency-calling mobile units (MUs) in a sparsely-populated area. In this example, the triangulation technique used to illustrate this embodiment of the invention is Time Difference of Arrival (TDOA), wherein base site equipment record the time of arrival of the signal received from emergency-calling MUs. It shall be understood that the invention also applies to Angle of Arrival (AOA), Enhanced Observed Time Difference (E-OTD), and other triangulation techniques.

In particular, the wireless communication system 200 comprises a first carrier network 202 including a first mobile switching center (MSC) 204 and possibly other network equipment, a first mobile positioning center (MPC) 206, and a base station 208 including a position determining equipment (PDE) 210. These elements 202, 204, 206, 208, and 210 are operated by a first wireless communication carrier. The first MSC 204 and base station 208 provide wireless telephone services for MUs located in a sparsely-populated geographical area 240 and possibly other areas. Such wireless telephone services include establishing voice communication links between MUs and the public safety answer point (PSAP) 250 for assisting the, users of MUs with emergency situations. The first MPC 206 and PDE 210 assist in locating MUs in emergency situations. Although a sparsely-populated geographical area is used to exemplify the various embodiments of the invention, it shall be understood that the geographical area need not be sparsely populated.

Similarly, the wireless communication system 200 further comprises a second carrier network 220 including a second MSC 222 and possibly other network equipment, a second MPC 224, and base stations 226 and 230 including respective PDEs 228 and 232. These elements 220, 222, 224, 226, 228, 230, and 232 are operated by a second wireless communication carrier. The second MSC 222 and base stations 226 and 230 provide wireless telephone services for MUs located in the sparsely-populated geographical area 240 and possibly other areas. Such wireless telephone services include establishing voice communication links between MUs and the PSAP 250 for assisting the users of MUs in emergency situations. The second MPC 224 and PDEs 228 and 232 assist in locating MUs in emergency situations.

In this example, the first and second wireless communication carriers individually do not have sufficient PDEs located in the sparsely-populated area 240 to effectively perform a triangulation algorithm to locate an emergency-calling MU. The first carrier only includes one PDE 210 and the second carrier only includes two PDEs 228 and 232, both less than the required minimum of three. However, the first and second carriers collectively have three PDEs 210, 228, and 232, sufficient to perform the triangulation algorithm to locate an emergency-calling MU. Thus, in this embodiment, the first and second carriers have a joint agreement to share their PDE resources such that each of them can accurately locate emergency-calling MUs.

As an example, a user of MU 234, currently assigned to base station (BS) 208, initiates an emergency call by dialing, for example, 911. In response, the MU 234 broadcasts an emergency call request, which is subsequently received by the first MSC 204 by way of base station (BS) 208. The first MSC 204 processes the emergency call request to establish a voice communication link between the MU 234 and the PSAP 250. Concurrently, the PDE 210 of base station 208 time stamps the emergency call request upon receipt with a time $t_6$, and sends the time stamp information to the first MPC 206 by way of the first MSC 204. Although base stations 226 and 230 are not assigned to handle calls for MU 234, their respective PDEs 228 and 232 receive the broadcast containing the emergency call request, and time stamps it upon receipt with respective times $t_7$ and $t_8$. The PDEs 228 and 232 then send the time stamp information to the first MPC 206 by way of the second MSC 222 and first MSC 204. Having the three time stamps ($t_6$, $t_7$, $t_8$), the first MPC 206 using a triangulation algorithm determines the approximate location of the MU 234, and sends the location information directly to the PSAP 250. Thus, in this example, the PSAP 250 has a voice communication link to the MU 234 and knows the approximate location of the MU 234. Therefore, the PSAP 250 can effectively assist the user of MU 234 with the emergency.

If, on the other hand, the user of MU 234 is currently assigned to base station (BS) 226 pertaining to the second carrier, the locating of MU 234 works in a similar fashion except that the time stamp information from PDEs 210, 228, and 232 is sent to the second MPC 224, which would process the information to determine the approximate location of MU 234 and subsequently send the location information to the PSAP 250. In this example, the second MSC 222 would establish a voice communication link between the MU 234 and the PSAP 250 via the base station 226. Also, the time stamp information from the PDE 210 would be routed to the second MPC 224 by way of the first and second MSCs 204 and 222, and the time stamp information from PDEs 228 and 232 would be routed to the second MPC 224 by way of only the second MSC 222.

In an alternative embodiment, each of the PDEs 210, 228, and 232 are coupled to both the first and second MSCs 204. In such embodiment, the PDEs 210, 228, and 232 send the time stamp information to the appropriate MPC only by way of the corresponding MSC. For example, if MU 234 is assigned to base station 208, then the PDEs 210, 228, and 232 send the time stamp information to the first MPC 206 by way of only the first MSC 204. Conversely, if MU 234 is assigned to base station 226, then the PDEs 210, 228, and 232 send the time stamp information to the second MPC 224 by way of only the second MSC 222. In such a case, there is no need for a direct connection between the first MSC 204 and the second MSC 222.

In the case of an AOA triangulation system, the PDEs 210, 228, and 232 determine the respective angles of arrival of the signal broadcasted from the emergency-calling MU 234. The PDEs 210, 228, and 232 then send the respective angle information to the appropriate MPC 204 or 224 for determination of the approximate location of the emergency-calling MU 234. In the case of an E-OTD triangulation system, the emergency-calling MU 234 records the time of arrival of respective burst signals transmitted from the base stations (BS) 208, 226, and 230. Using the timing information, the emergency-calling MU 234 determines it own approximate location, and subsequently sends the location information to the PSAP 250 by way of its assigned base station (BS) and the appropriate MSC.

Figure 3:
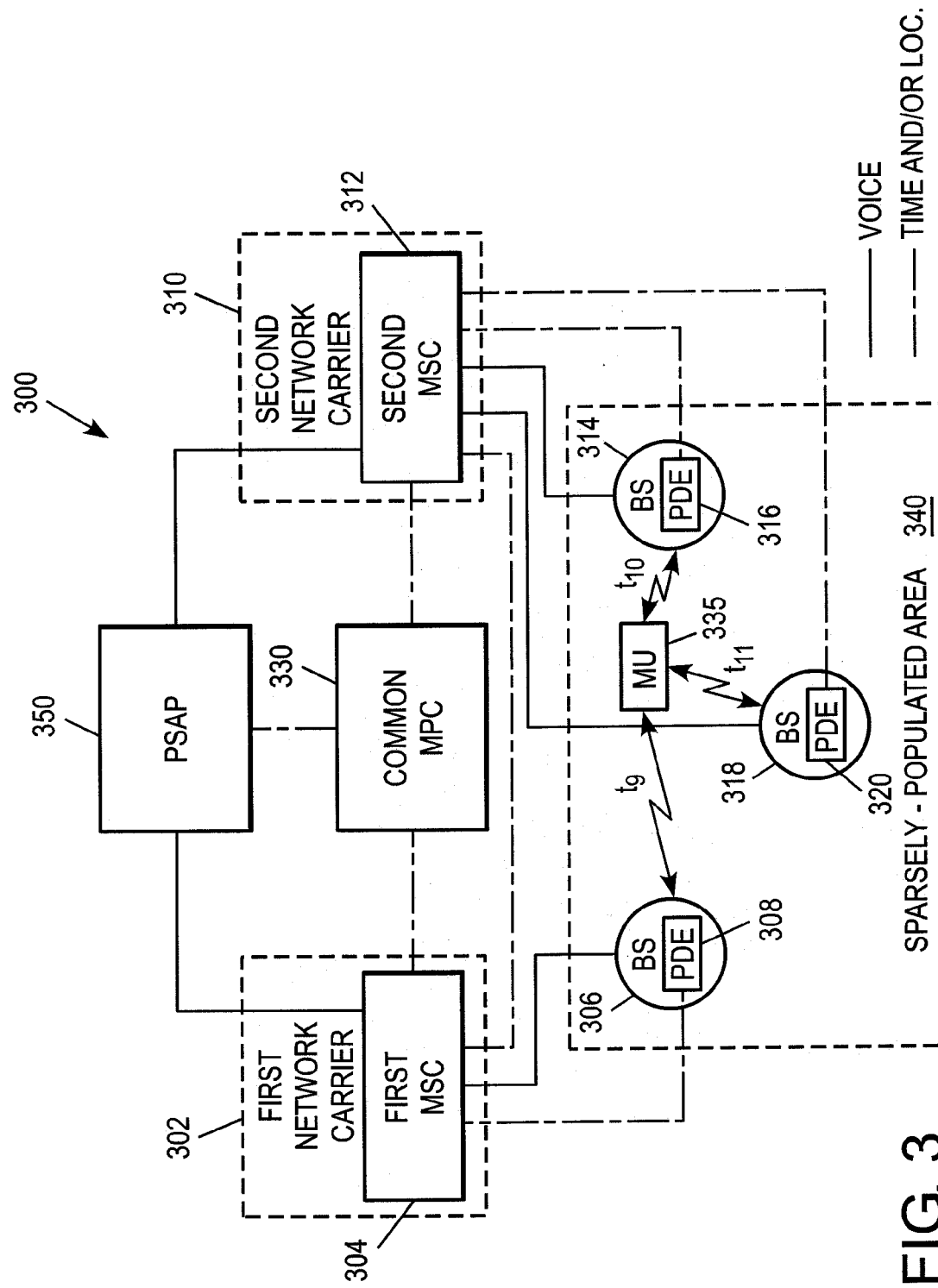
FIG. 3 illustrates a block diagram of another exemplary wireless communication system in accordance with another embodiment of the invention.

FIG. 3 illustrates a block diagram of another exemplary wireless communication system 300 in accordance with another embodiment of the invention. In summary, the wireless communication system 300 is characterized in the sharing of MPC and PDE resources by two or more different wireless communication carriers in order to provide effective triangulation for locating emergency-calling MUs in a sparsely-populated area. Similar to the above example, the triangulation technique used to illustrate this embodiment of the invention is the TDOA. However, it shall be understood that the invention also applies to the AOA, E-OTD, and other triangulation techniques.

In particular, the wireless communication system 300 comprises a first carrier network 302 including a first MSC 304 and possibly other network equipment, and a base station (BS) 306 including a PDE 308. These elements 302, 304, 306, and 308 are operated by a first wireless communication carrier. The first MSC 304 and base station 306 provide wireless telephone services for MUs located in a sparsely-populated geographical area 340 and possibly other areas. Such wireless telephone services include establishing voice communication links between MUs and a PSAP 350 for assisting the users of the MUs with emergency situations. As discussed in more detail below, the PDE 308 assists in locating MUs in emergency situations.

Similarly, the wireless communication system 300 further comprises a second carrier network 310 including a second MSC 312 and possibly other network equipment, and base stations (BS) 314 and 318 including their respective PDEs 316 and 320. These elements 310, 312, 314, 316, 318, and 320 are operated by a second wireless communication carrier. The second MSC 312 and base stations 314 and 318 provide wireless telephone services for MUs located in the sparsely-populated geographical area 340 and possibly other areas. Such wireless telephone services include establishing voice communication links between MUs and the PSAP 350 for assisting users of MUs with emergency situations. As discussed in more detail below, the PDEs 316 and 318 assist in locating MUs in emergency situations.

In this example, the first and second wireless communication carriers individually do not have sufficient PDEs located in the sparsely-populated area 340 to effectively perform a triangulation algorithm to locate an emergency-calling MU. The first carrier only includes one PDE 308 and the second carrier only includes two PDEs 316 and 320, both less than the required minimum of three. However, the first and second carriers collectively have three PDEs 308, 316, and 320 sufficient to perform the triangulation algorithm to locate an emergency-calling MU. Thus, in this embodiment, the first and second carriers have a joint agreement to share their PDE resources such that each of them can accurately locate emergency-calling MUs. Additionally, the joint agreement may provide the sharing of a common MPC 330 that determines the approximate location of emergency-calling MUs.

As an example, a user of MU 335, currently assigned to base station (BS) 306, initiates an emergency call by dialing, for example, 911. In response, the MU 335 broadcasts an emergency call request, which is subsequently received by the first MSC 304 by way of base station (BS) 306. The first MSC 304 processes the emergency call request to establish a voice communication link between the MU 335 and the PSAP 350. Concurrently, the PDE 308 of base station 306 time stamps the emergency call request upon receipt with a time $t_9$, and sends the time stamp information to the common MPC 330 by way of the first MSC 304. Although base stations 314 and 318 are not assigned to handle calls for MU 335, their respective PDEs 316 and 320 receive the broadcast containing the emergency call request, and time stamps it upon receipt with respective times $t_{10}$ and $t_{11}$. The PDEs 316 and 320 then send the time stamp information to the common MPC 330 by way of the second MSC 312. Having the three time stamps ($t_9$, $t_{10}$, $t_{11}$), the common MPC 330 using a triangulation algorithm determines the approximate location of the MU 335, and sends the location information directly to the PSAP 350. Thus, in this example, the PSAP 350 has a voice communication link to the MU 335 and knows the approximate location of the MU 335. Therefore, the PSAP 350 can effectively assist the user of MU 335 with the emergency.

If, on the other hand, the user of MU 335 is currently assigned to base station (BS) 314 pertaining to the second carrier, the location of MU 335 works in a similar fashion. In this case, the second MSC 312 establishes a voice communication link between the MU 335 and the PSAP 350 via the base station (BS) 314. The time stamp information from the PDEs 308, 316, and 320 would be routed to the common MPC 330 in the same way as discussed above.

In an alternative embodiment, each of the PDEs 308, 316, and 320 are coupled to both the first MSC 304 and the second MSC 312. In this embodiment, the PDEs 308, 316, and 320 send the time stamp information to the common MPC only by way of the MSC that is processing the emergency call request. For example, if MU 335 is assigned to base station (BS) 306, then the PDEs 308, 316, and 320 send the time stamp information to the common MPC 330 by way of the first MSC 304. Conversely, if MU 335 is assigned to base station (BS) 314, then the PDEs 308, 316, and 320 send the time stamp information to the common MPC 330 by way of the second MSC 312.

In the case of an AOA triangulation system, the PDEs 308, 316, and 320 determine the respective angles of arrival of the signal broadcasted from the emergency-calling MU 335. The PDEs 308, 316, and 320 then send the respective angle information to the common MPC 330 for determination of the approximate location of the emergency-calling MU 335. In the case of an E-OTD triangulation system, the emergency-calling MU 335 records the time of arrival of respective burst signals transmitted from the base stations (BS) 306, 314, and 318. Using the timing information, the emergency-calling MU 335 determines it own approximate location, and subsequently sends the location information to the PSAP 350 by way of its assigned base station (BS) and the appropriate MSC.

Figure 4:
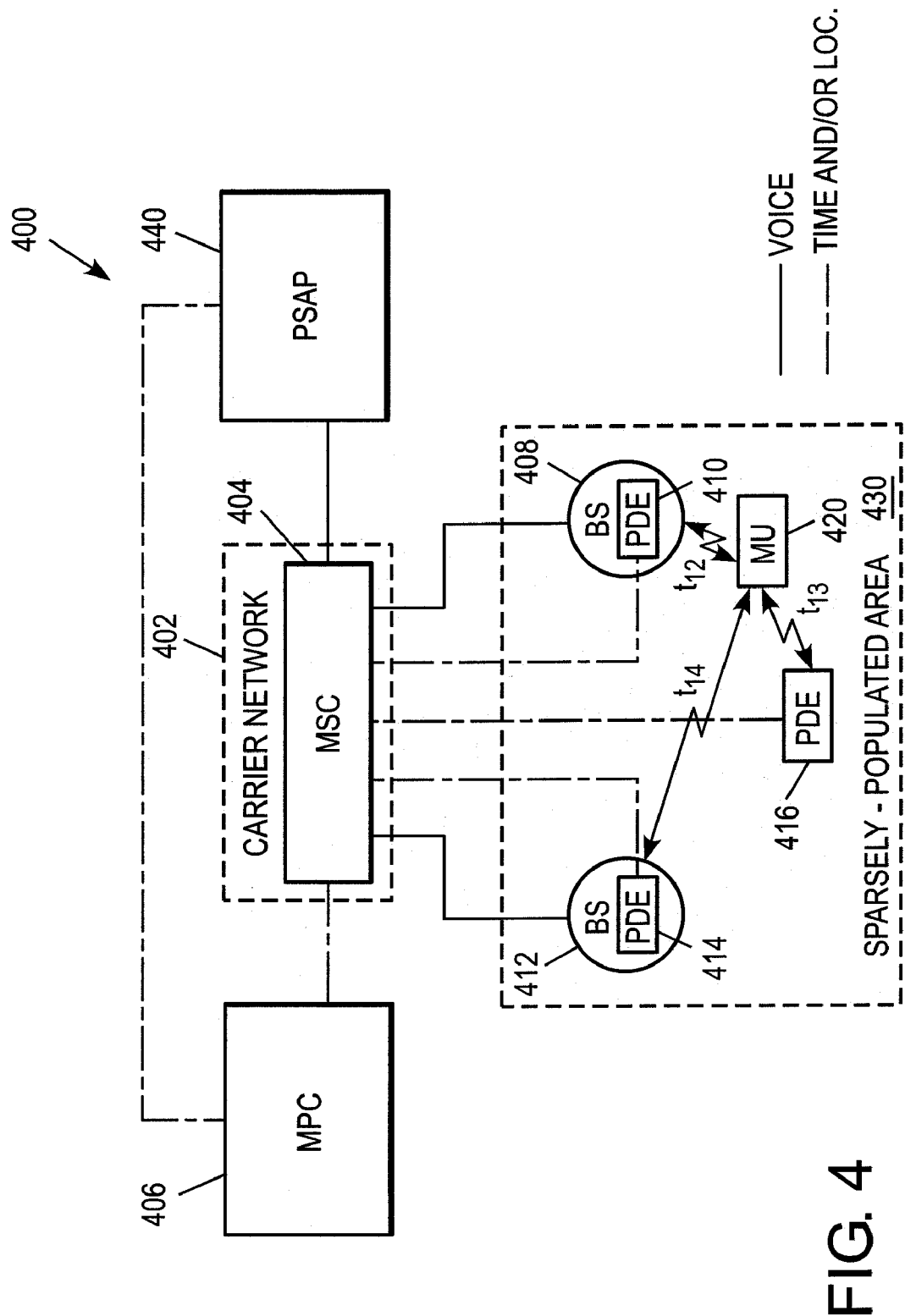
FIG. 4 illustrates a block diagram of another exemplary wireless communication system in accordance with another embodiment of the invention.

FIG. 4 illustrates a block diagram of another exemplary wireless communication system 400 in accordance with another embodiment of the invention. In summary, the wireless communication system 400 is characterized in the addition of one or more standalone PDE (i.e., not associated with a base station) to provide effective triangulation for locating emergency-calling MUs in a sparsely-populated area. Similar to the above examples, the triangulation technique used to illustrate this embodiment of the invention is the TDOA. However, it shall be understood that the invention also applies to the AOA, E-OTD, and other triangulation techniques.

In particular, the wireless communication system 400 comprises a carrier network 402 including an MSC 404 and possibly other network equipment, and base stations 408 and 412 including respective PDEs 410 and 414. The MSC 404 and base stations (BS) 408 and 412 provide wireless telephone services for MUs located in a sparsely-populated geographical area 430 and possibly other areas. Such wireless telephone services include establishing voice communication links between MUs and a PSAP 440 for assisting the users of the MUs with emergency situations. In addition to PDEs 410 and 414, a standalone PDE 416 is provided in the sparsely-populated area 430 in order to achieve at least the minimum number of PDEs to perform effective triangulation in the area 430. The standalone PDE 416 is not associated with a base station (BS), and may be located, for example, at a barn or silo.

As an example, a user of MU 420, currently assigned to base station (BS) 408, initiates an emergency call by dialing, for example, 911. In response, the MU 420 broadcasts an emergency call request, which is subsequently received by the MSC 404 by way of base station (BS) 408. The MSC 404 processes the emergency call request to establish a voice communication link between the MU 420 and a PSAP 440. Concurrently, the PDE 410 of base station (BS) 408 time stamps the emergency call request upon receipt with a time $t_{12}$, and sends the time stamp information to the MPC 406 by way of the MSC 404. Although base station (BS) 412 is not assigned to handle calls for MU 420, its PDE 414 receives the broadcast containing the emergency call request and time stamps it upon receipt with time $t_{14}$. In addition, the standalone PDE 416 also receives the broadcast containing the emergency call request and time stamps it upon receipt with time $t_{13}$. The PDEs 414 and 416 also send the time stamp information to the MPC 406 by way of the MSC 404. Having the three time stamps ($t_{12}$, $t_{13}$, $t_{14}$), the MPC 406 using a triangulation algorithm determines the approximate location of the MU 420, and sends the location information directly to the PSAP 440. Thus, in this example, the PSAP 440 has a voice communication link to the MU 420 and knows the approximate location of the MU 420. Therefore, the PSAP 440 can effectively assist the user of MU 420 with the emergency.

In the case of an AOA triangulation system, the PDEs 410, 414, and 416 determine the respective angles of arrival of the signal broadcasted from the emergency-calling MU 420. The PDEs 410, 414, and 416 then send the respective angle information to the MPC 406 for determination of the approximate location of the emergency-calling MU 420. In the case of an E-OTD triangulation system, the emergency-calling MU 420 records the time of arrival of respective burst signals transmitted from the base stations (BS) 408 and 412, and the standalone PDE 416, which in this case transmits a burst signal for the purpose of effectuating triangulation by the emergency-calling MU 420. Using the timing information, the emergency-calling MU 420 determines it own approximate location, and subsequently sends the location information to the PSAP 440 by way of its assigned base station (BS) and the MSC 404.

Figure 5:
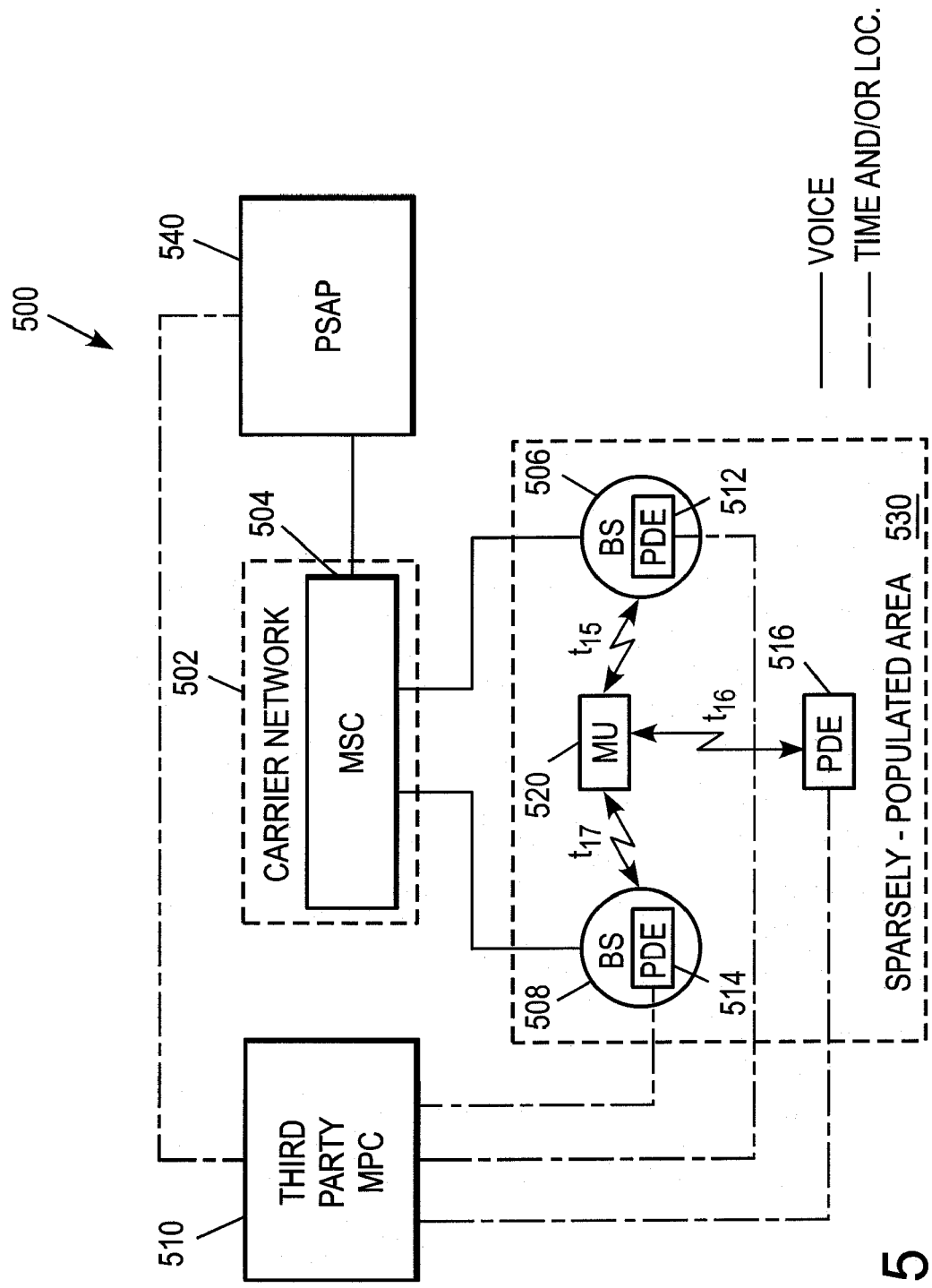
FIG. 5 illustrates a block diagram of another exemplary wireless communication system in accordance with another embodiment of the invention.

FIG. 5 illustrates a block diagram of another exemplary wireless communication system 500 in accordance with another embodiment of the invention. In summary, the wireless communication system 500 is characterized in a third party handling the locating of emergency-calling MUs and providing the location information to a PSAP, and a wireless communication carrier handling the setup of a voice communication link between emergency-calling MUs and the PSAP. Similar to the above examples, the triangulation technique used to illustrate this embodiment of the invention is the TDOA. However, it shall be understood that the invention also applies to the AOA, E-OTD, and other triangulation techniques.

In particular, the wireless communication system 500 comprises a carrier network 502 including an MSC 504 and possibly other network equipment, and base stations 506 and 508. The elements 502, 504, 506 and 508 are operated by a wireless communication carrier. The MSC 504 and base stations (BS) 506 and 508 provide wireless telephone services for MUs located in a sparsely-populated geographical area 530 and possibly other areas. Such wireless telephone services include establishing voice communication links between MUs and a PSAP 540 for assisting the users of MUs with emergency situations.

In addition, the wireless communication system 500 comprises a third-party MPC 510, PDEs 512 and 514, and a standalone PDE 516. These elements 510, 512, 514, and 516 are operated by a third party. Although PDEs 512 and 514 are operated by the third party, the PDEs 512 may be housed in the respective base stations (BS) 506 and 508. The standalone PDE 516 is not associated with a base station (BS), and may be located, for example, at a barn or silo. The wireless communication carrier and third party may enter into an agreement whereby the third party operates the MPC and PDEs 512, 514, and 516 to locate emergency-calling MUs for the wireless communication carrier.

As an example, a user of MU 520, currently assigned to base station (BS) 506, initiates an emergency call by dialing, for example, 911. In response, the MU 520 broadcasts an emergency call request, which is subsequently received by the MSC 504 by way of base station (BS) 506. The MSC 504 processes the emergency call request to establish a voice communication link between the MU 520 and a PSAP 540. Concurrently, the PDEs 512, 514, and 516, operated by the third party, time stamp the emergency call request upon receipt with respective times $t_{15}$, $t_{16}$, $t_{17}$, and send the time stamp information directly to the third party MPC 510. Having the three time stamps ($t_{15}$, $t_{16}$, $t_{17}$), the MPC 510 using a triangulation algorithm determines the approximate location of the MU 520, and sends the location information directly to the PSAP 540. Thus, in this example, the PSAP 540 has a voice communication link to the MU 520 and knows the approximate location of the MU 520. Therefore, the PSAP 540 can effectively assist the user of MU 520 with the emergency.

In the case of an AOA triangulation system, the PDEs 512, 514, and 516 determine the respective angles of arrival of the signal broadcasted from the emergency-calling MU 520. The PDEs 512, 514, and 516 then send the respective angle information to the third party MPC 510 for determination of the approximate location of the emergency-calling MU 520. In the case of an E-OTD triangulation system, the emergency-calling MU 520 records the time of arrival of respective burst signals transmitted from the base stations (BS) 506 and 508, and the standalone PDE 516, which in this case transmits a burst signal for the purpose of effectuating triangulation by the emergency-calling MU 520. Using the timing information, the emergency-calling MU 520 determines it own approximate location, and subsequently sends the location information to the PSAP 540 by way of its assigned base station (BS) and the MSC 504.

Figure 6:
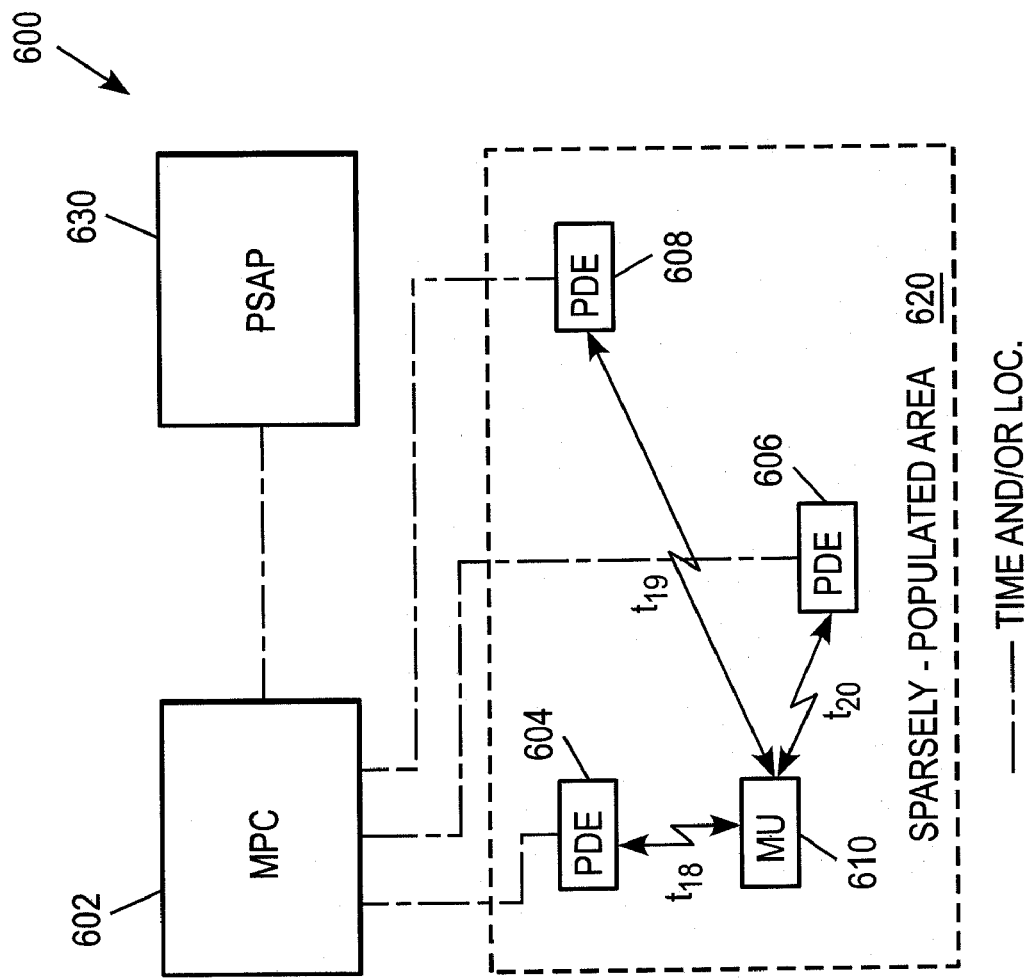
FIG. 6 illustrates a block diagram of another exemplary wireless communication system in accordance with another embodiment of the invention.

FIG. 6 illustrates a block diagram of another exemplary wireless communication system 600 in accordance with another embodiment of the invention. In summary, the wireless communication system 600 is characterized in a system including equipment for only locating emergency-calling MUs, and including none or limited voice communication capability. Similar to the above examples, the triangulation technique used to illustrate this embodiment of the invention is the TDOA. However, it shall be understood that the invention also applies to the AOA, E-OTD, and other triangulation techniques.

In particular, the wireless communication system 600 comprises an MPC 602 and a plurality of standalone PDEs 604, 606, and 608 located in a sparsely-populated area 620. Such a sparsely-populated area 620, in this example, may be a very remote mountainous and/or desert region, where use of wireless telephone services is nil or relatively low. The MPC 602 and standalone PDEs 604, 606, and 608 are together capable of locating emergency-calling MUs, and providing such location information to a PSAP 630. Although the wireless communication system 600 is capable of locating emergency-calling MUs, it may have none or limited voice communication capability. In this example, there is no voice communication capability. However, voice communication capability restricted for emergency use only may be incorporated into any of the PDE equipment.

As an example, a user of MU 610 initiates an emergency call by dialing, for example, 911. In response, the MU 610 broadcasts an emergency call request. Although there are no base stations (BS) to forward the request to an MSC, the PDEs 604, 606, and 620 receive the emergency call request, time stamp it upon receipt with respective times $t_{18}$, $t_{19}$, $t_{20}$, and send the time stamp information to the MPC 602. Having the three time stamps ($t_{18}$, $t_{19}$, $t_{20}$), the MPC 602 using a triangulation algorithm determines the approximate location of the MU 610, and sends the location information directly to the PSAP 630. Thus, in this example, the PSAP 630 knows the approximate location of the MU 610, and can summons a search and rescue unit to find and assist the user of MU 610 with the emergency.

In the case of an AOA triangulation system, the PDEs 604, 606, and 608 determine the respective angles of arrival of the signal broadcasted from the emergency-calling MU 620. The PDEs 604, 606, and 608 then send the respective angle information to the MPC 602 for determination of the approximate location of the emergency-calling MU 610. In the case of an E-OTD triangulation system, the emergency-calling MU 620 records the time of arrival of respective burst signals transmitted from the PDEs 604, 606, and 608, which in this case transmit respective burst signals for the purpose of effectuating triangulation by the emergency-calling MU 610. Using the timing information, the emergency-calling MU 610 determines it own approximate location, and subsequently sends the location information to the PSAP 630.

Figure 7:
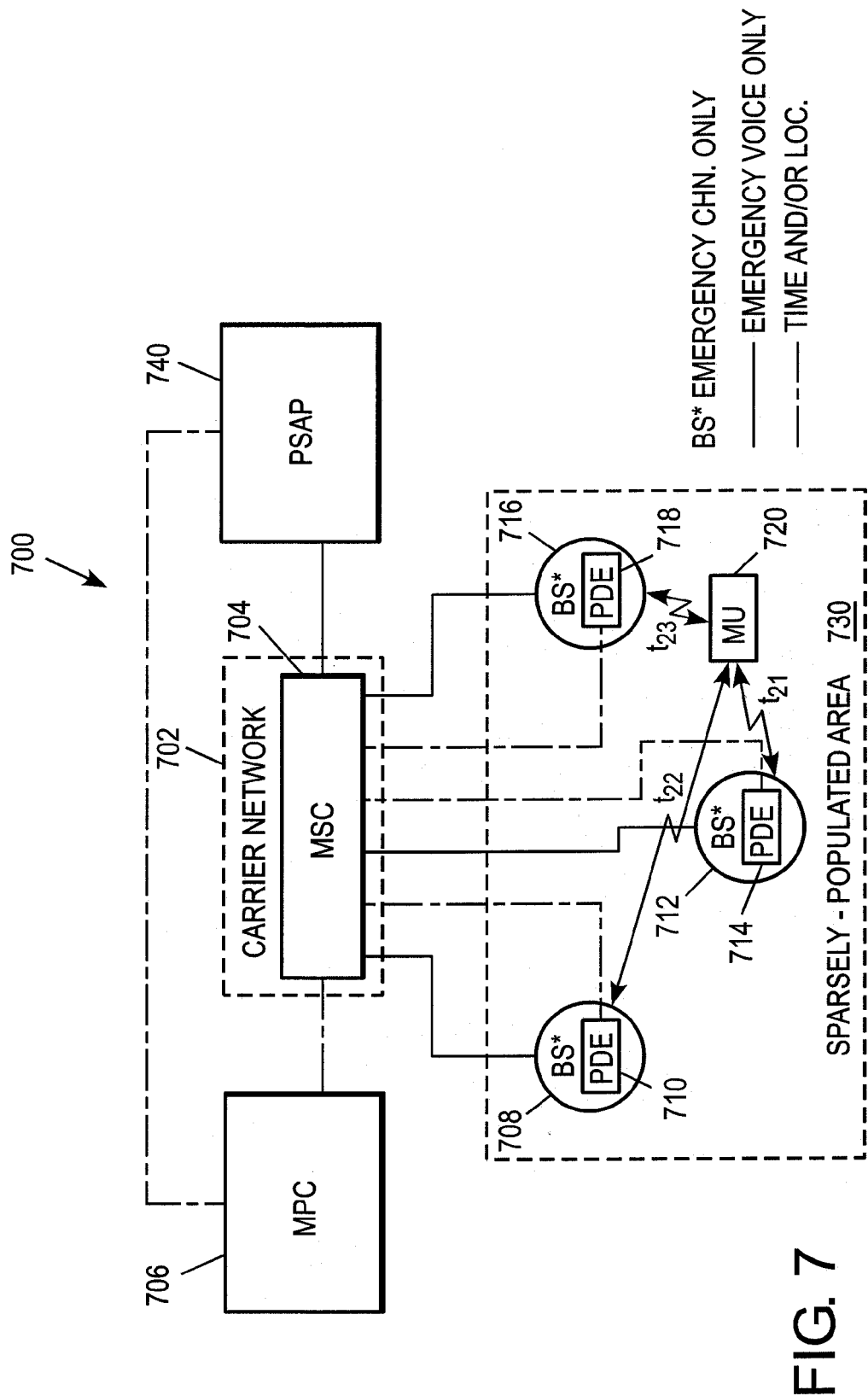
FIG. 7 illustrates a block diagram of another exemplary wireless communication system in accordance with another embodiment of the invention.

FIG. 7 illustrates a block diagram of another exemplary wireless communication system 700 in accordance with another embodiment of the invention. In summary, the wireless communication system 700 is characterized in a system including base stations (BS) limited to establishing voice communication links between emergency-calling MUs and a PSAP, and equipment for locating emergency-calling MUs. Similar to the above examples, the triangulation technique used to illustrate this embodiment of the invention is the TDOA. However, it shall be understood that the invention also applies to the AOA, E-OTD, and other triangulation techniques.

In particular, the wireless communication system 700 comprises a carrier network 702 including an MSC 704 and possibly other network equipment, and base stations (BS) 708, 712, and 716 including respective PDEs 710, 714, and 718. The MSC 704 and base stations (BS) 708, 712, and 716 provide emergency-only, wireless telephone services for MUs located in a sparsely-populated geographical area 730 and possibly other areas. In this example, the base stations (BS) 708, 712, and 716 are limited for use in emergency situations, and provide voice communication links between MUs and a PSAP 740 for assisting the users of the MUs with emergency situations. The MPC 706 and PDEs 708, 712, and 716 operate together to determine the location of emergency-calling MUs, and provide the location information to the PSAP 740.

As an example, a user of MU 720, currently assigned to base station (BS) 716 for emergency assistance only, initiates an emergency call by dialing, for example, 911. In response, the MU 720 broadcasts an emergency call request, which is subsequently received by the MSC 704 by way of base station (BS) 716. The MSC 704 processes the emergency call request to establish a voice communication link between the MU 720 and the PSAP 740. Concurrently, the PDEs 710, 714, and 718 time stamp the emergency call request upon receipt with respective times $t_{22}$, $t_{21}$, $t_{23}$, and send the time stamp information to the MPC 706 by way of the MSC 704. Having the three time stamps ($t_{22}$, $t_{21}$, $t_{23}$), the MPC 706 using a triangulation algorithm determines the approximate location of the MU 720, and sends the location information directly to the PSAP 740. Thus, in this example, the PSAP 740 has a voice communication link to the MU 720 and knows the approximate location of the MU 720. Therefore, the PSAP 740 can effectively assist the user of MU 720 with the emergency.

In the case of an AOA triangulation system, the PDEs 710, 714, and 718 determine the respective angles of arrival of the signal broadcasted from the emergency-calling MU 720. The PDEs 710, 714, and 718 then send the respective angle information to the MPC 706 for determination of the approximate location of the emergency-calling MU 720. In the case of an E-OTD triangulation system, the emergency-calling MU 720 records the time of arrival of respective burst signals transmitted from the base stations 708, 712, and 716. Using the timing information, the emergency-calling MU 720 determines it own approximate location, and subsequently sends the location information to the PSAP 740.

Figure 8:
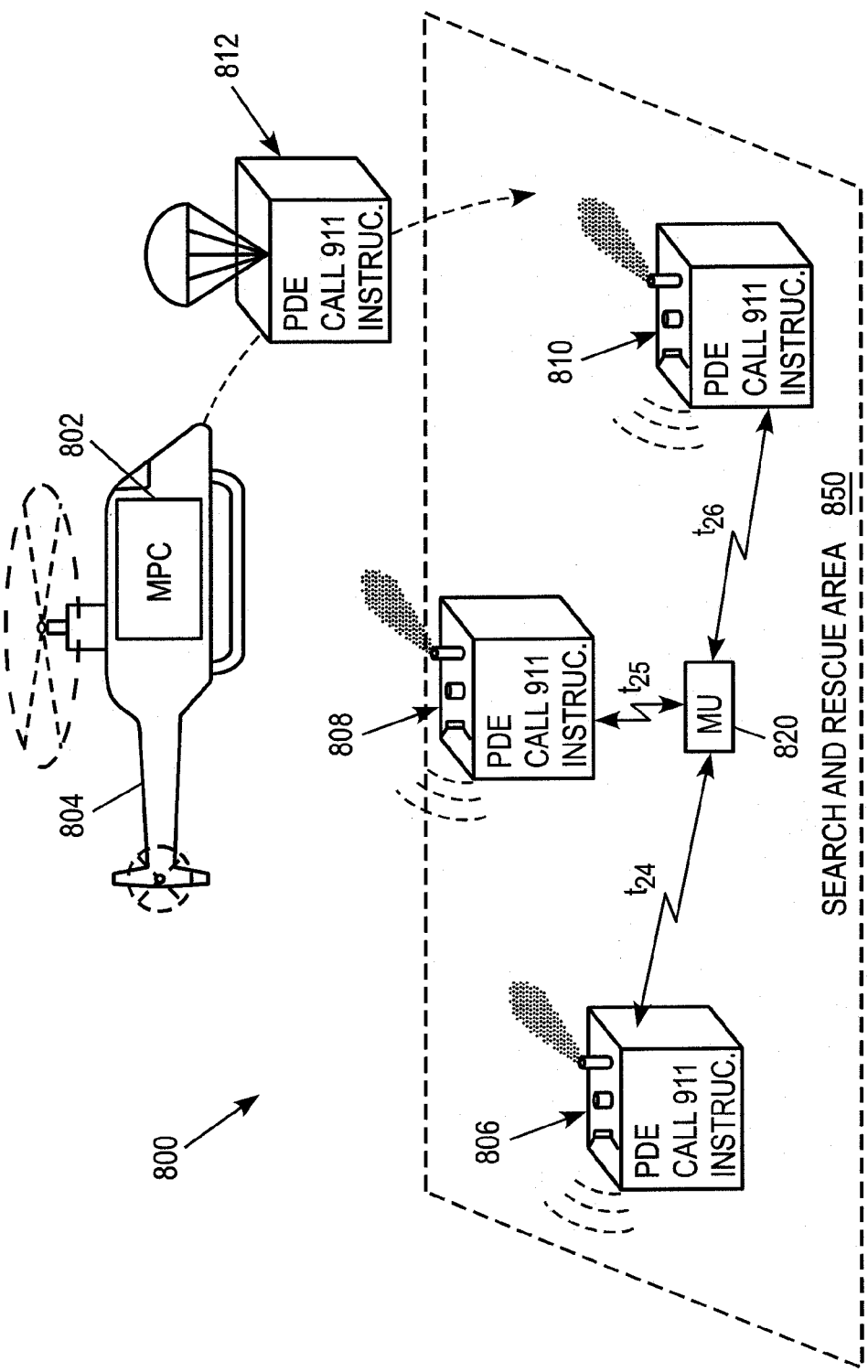
FIG. 8 illustrates a block diagram of another exemplary wireless communication system in accordance with another embodiment of the invention.

FIG. 8 illustrates a perspective view of an exemplary wireless communication system 800 in accordance with another embodiment of the invention. In summary, the wireless communication system 800 is particularly adapted in search and rescue situations where a person-in-distress is lost in, for example, a wilderness and/or mountainous area. In particular, a plurality of wireless PDEs are dropped from a search and rescue aircraft (e.g., helicopter or airplane) to various locations within a search and rescue area. On board the search and rescue aircraft is a wireless MPC which is able to communicate with the wireless PDEs to receive time stamp information related to an emergency-calling MU. Using the time stamp information, the wireless MPC determines the approximate location of the emergency-calling MU, and notifies the pilot, co-pilot, and/or other personnel on board the search and rescue aircraft of the same. Similar to the above examples, the triangulation technique used to illustrate this embodiment of the invention is the TDOA. However, it shall be understood that the invention also applies to the AOA, E-OTD, and other triangulation techniques.

More specifically, the wireless communication system 800 comprises a wireless MPC 802 located, in this example, on board a search and rescue aircraft 804. While flying over a search and rescue area 850, the aircraft 804 drops a plurality of wireless PDEs 806, 808, 810, and 812 at various locations within the search and rescue area 850. Each of the wireless PDEs comprises time stamp equipment for determining the time of the receipt of an emergency call request; a wireless transmitter for transmitting the time stamp to the wireless MPC 802; and a housing to house the time stamp equipment, wireless transmitter, and other equipment, the housing being made of a relatively strong material sufficient to protect the internal equipment from ground impact from at least a parachute-assisted fall.

Each of the wireless PDEs comprises a deployable parachute to assist the PDE in its descent to ground; one or more alerting equipment such as a speaker to generate an alarm sound, a light source such as a strobe and/or rotating light source, and/or a smoke-emitter; and instruction indicia located on the housing to provide emergency instruction to the lost party. Also, each of the PDEs may include a GPS receiver to determine its own location, and transmit the location to the wireless MPC 802. Additionally, each of the PDEs may include equipment to generate and transmit a pre-recorded message to an emergency-calling MU. Further, each of the wireless PDEs may include a relay-transceiver to provide a voice communication link between an emergency-calling MU and the personnel on the search and rescue aircraft 804.

As an example, a search and rescue agency receives a call providing information related to a lost party located, for example, in a wilderness-mountainous region. In response to the call, the search and rescue agency dispatches the search and rescue aircraft 804 to the wilderness-mountainous region. After defining the search and rescue area 850, the helicopter 804 begins to drop the wireless PDEs 806, 808, 810, and 812 at various locations within the search and rescue area 850. Once on the ground, the wireless PDEs transmit their respective GPS-derived location to the wireless MPC 802. Also, the wireless PDEs activates their respective alerting equipment, such as the sound-emitting device, light-emitting device, and/or smoke-emitting device. Using any one or more of these alerting stimuli, the lost party may locate one of the PDEs 806, 808, 810, and 812. In this example, the lost party locates PDE 808.

Upon locating PDE 808, the lost party reads the instructions located on the housing of the PDE 808. The instructions may state "Call 911" and "Remain stationary at your current location only if it is safe to do so." Upon reading the instructions, the lost party makes an emergency call request (e.g., dials 911) from his/her MU 820. In response, the MU 820 broadcasts an emergency call request. The PDEs 806, 808, and 810 receive the emergency call request and time stamp it with the following respective times $t_{24}$, $t_{25}$, and $t_{26}$. The PDEs 806, 808, and 810 then wirelessly transmits the time stamp information ($t_{24}$, $t_{25}$, $t_{26}$) to the wireless MPC 802 located on the search and rescue aircraft 804. Using the time stamp information, the wireless MPC 802 using a triangulation algorithm determines the approximate location of the lost party. Using the location information, the search and rescue aircraft 804 is able to locate the lost party.

After initially determining the approximate location, the search and rescue aircraft 804 may drop additional PDEs around the approximate location of the lost party to further refine the search of the lost party. Additionally, after the PDE 808 has received the emergency call request from the MU 820, the PDE 808 may establish a voice communication link between itself and the MU 820 in order to provide the MU 820 with a pre-recorded message containing further instructions for the lost party. Also, as previously discussed, the PDE 808 may be able to establish a voice communication link between the emergency-calling MU 820 and the search and rescue aircraft 804.

In the case of an AOA triangulation system, the PDEs 806, 808, and 810 determine the respective angles of arrival of the signal broadcasted from the emergency-calling MU 820. The PDEs 806, 808, and 810 then send the respective angle information to the MPC 802 for determination of the approximate location of the emergency-calling MU 820. In the case of an E-OTD triangulation system, the emergency-calling MU 820 records the time of arrival of respective burst signals transmitted from the 806, 808, and 810, which in this case transmit respective burst signals for the purpose of effectuating triangulation by the emergency-calling MU 820. Using the timing information, the emergency-calling MU 820 determines it own approximate location, and subsequently sends the location information to the aircraft 802 via, for example, a voice communication link.

In an alternative embodiment, the rescue aircraft 804 deploys the wireless PDEs 806, 808, 810, and 812 having respective GPS receivers in a "hot" to "warm" stage, i.e., knowing their present locations or about to determine their respective present locations. As the PDEs descend from the rescue aircraft 804, they continue to update their own respective locations. While on descent, each PDE transmits a signal that attempts to elicit a response from the MU 820 of the party-in-distress. Such signal may include a paging message, a re-registration message, or other response-eliciting message. If the MU 820 receives the response-eliciting message, it may broadcast a response to the message, which may be picked up by three or more descending PDEs. The PDEs time stamp the response, and sends the time stamp information as well as its present location information (which is continuously changing because the PDEs are descending) to the MPC 802 on board the rescue aircraft 804. Using the time stamp and location of PDEs information, the MPC 802 can determine the approximate location of the MU 820.

In yet another alternative embodiment adapted to locate a party-in-distress caught in an avalanche, the PDEs may be configured to penetrate the snow in a manner that their parachutes and antenna remain above the snow level. The parachutes being above the snow level makes it easier to locate the PDEs. The antenna being above the snow level allows the PDEs to better transmit and receive signals. The MU of the party-in-distress, e.g., a skier, may be placed in a special mode which causes the MU to periodically transmit a registration message. Typically, when an MU has service, it operates in a normal mode. When the MU does not have service, it typically goes into a sleep mode. The party-in-distress may configure the MU to go into the registration mode instead of the sleep mode to periodically transmit a registration message. The deployed PDEs and the MPC on board the rescue aircraft use the registration message to determine the approximate location of the party-in-distress.

Figure 9:
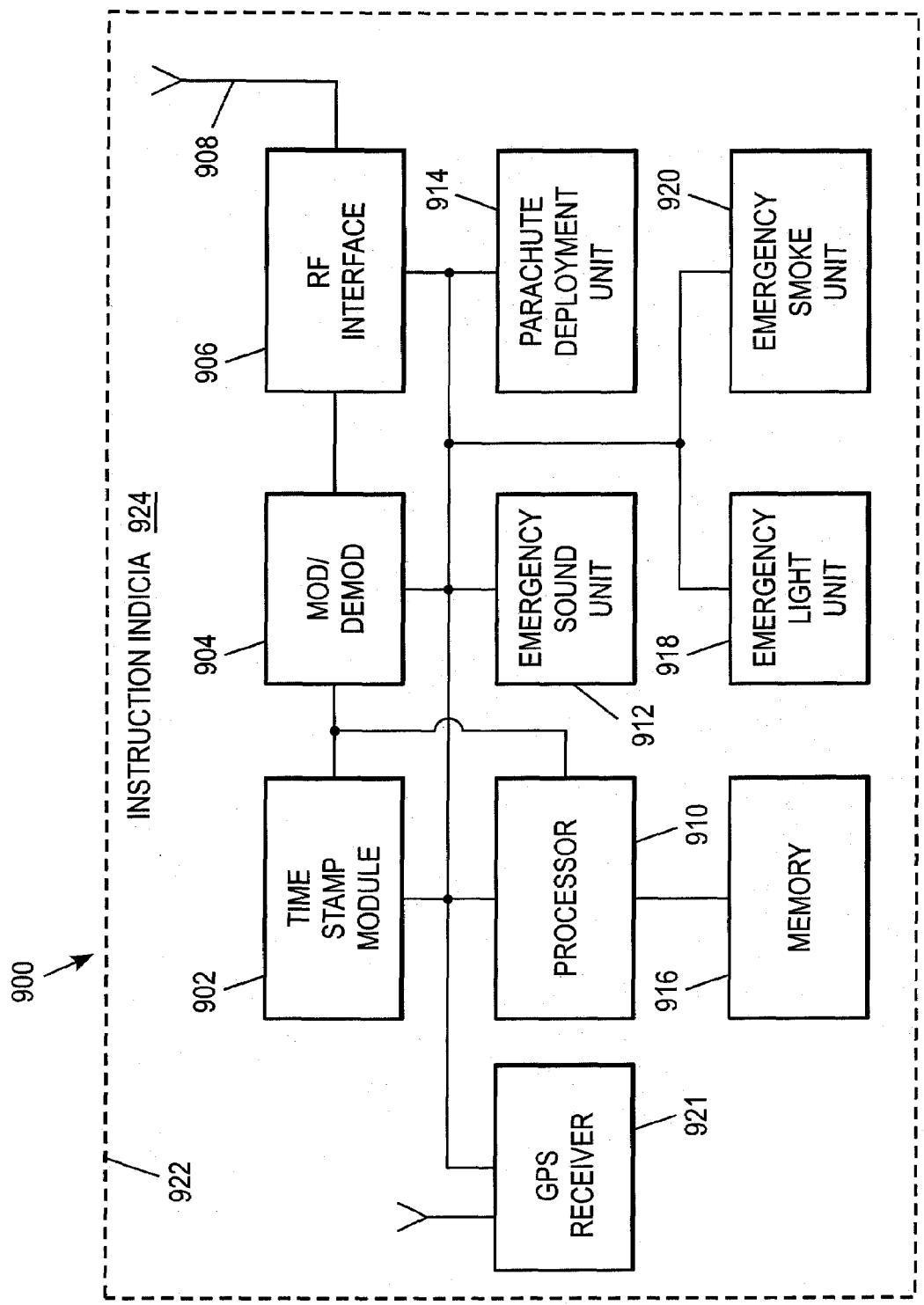
FIG. 9 illustrates a block diagram an exemplary wireless position determining equipment (PDE) in accordance with another embodiment of the invention.

FIG. 9 illustrates a block diagram of an exemplary wireless position determining equipment (PDE) 900 in accordance with another embodiment of the invention. The wireless PDE 900 may be an exemplary detailed version of any of the wireless PDEs 806, 808, 810, and 812 of wireless communication system 800 described above. In particular, the wireless PDE 900 comprises a time (or angle) stamp module 902, a modulator/demodulator (mod/demod) 904, a radio frequency (RF) interface 906, an antenna 908, a processor 910, an emergency sound unit 912, a parachute deployment unit 914, a memory 916, an emergency light unit 918, an emergency smoke unit 920, and a GPS receiver 921.

The antenna 908 provides an interface between a wireless transmission medium and a wired transmission medium. The RF interface 906 conditions an outgoing signal for transmission via the wireless medium and conditions an incoming signal for demodulating by the mod/demod 904. The mod/demod 904 modulates a carrier with an outgoing signal and removes the carrier from an incoming signal. The time stamp module 902 generates a time associated with the receipt of an emergency-call request. The emergency sound unit 912 generates an alarm sound in response to a command received from the processor 910. The parachute deployment unit 914 deploys a parachute in response to a command received from the processor 910. The emergency light unit 918 generates an emergency light in response to a command received from the processor 910. The emergency smoke unit 920 emits an emergency smoke in response to a command received from the processor 910. The GPS receiver 921 determines and provides the location of the PDE 900 in response to a command received from the processor 910.

The processor 910 receives data from various units of the PDE 900 and controls the various operations of the PDE 900. The memory 916, serving generally as a computer readable medium, stores data and one or more software modules adapted to control the processor 910 in performing its various operations. Each of the units are enclosed in a housing 922 made of a relatively strong material sufficient to protect the internal equipment from ground impact from at least a parachute-assisted fall. The housing 922 may include instruction indicia 924 to provide instructions to a lost party.

In operation, when the wireless PDE 900 is initially dropped from a search and rescue aircraft, the parachute deployment unit 914 provides information related to the rate-of-descent of the PDE 900 to the processor 910. When the rate-of-descent of the PDE 900 reaches or exceeds a predetermined threshold, the processor 910 sends a command signal to the parachute deployment unit 914 instructing it to deploy the parachute. In response, the parachute deployment unit 914 deploys the parachute. During the parachute-assisted descent, the parachute deployment unit 914 continues to send rate-of-descent information of the PDE 900 to the processor 910. When the processor 910 detects that the rate-of-descent is zero (0), meaning the PDE 900 is at ground level, the processor 910 sends appropriate commands to activate the emergency sound unit 912, emergency light unit 918, and the emergency smoke unit 920. The processor 910 receives the location information of the PDE 900 from the GPS receiver 921, and transmits the location information to a wireless MPC by way of the mod/demod 904, RF interface 906, and antenna 908.

When the PDE 900 receives an emergency call request from the MU of a lost party, the processor 910 and the time stamp module 902 receive the emergency call request via the antenna 908, RF interface 906, and mod/demod 904. The time stamp module 902 time stamps the received signal and provides the time stamp information to the processor 910. The processor 910 stores the time stamp information and the emergency call request information in the memory 916. The processor 910 then sends the time stamp and emergency call request information to a wireless MPC located on a search and rescue aircraft by way of the mod/demod 904, RF interface 906 and antenna 908.

If the PDE 900 is able to establish a voice communication link with the emergency-calling MU, the processor 910 sends an emergency call response with the appropriate RF channel information to the emergency-calling MU via the mod/demod 904, RF interface 906, and antenna 908. After the voice communication link to the emergency-calling MU is established, the processor 910 may access a pre-recorded message stored in the memory 916 and send it to the MU via the mod/demod 904, RF interface 906, and antenna 908. If the PDE 900 is able to establish another voice communication link with the search and rescue aircraft, the processor 910 sends a call request to the search and rescue aircraft and subsequently receives a response from the same. Once a voice communication link is established, the processor 910 may receive voice communications from the MU and relay them to the search and rescue aircraft, and vice-versa.

In the case of an AOA triangulation system, the time stamp module 902 (in this case, an angle stamp module) records the angle of arrival of the signal broadcasted from the emergency-calling MU. The processor 910 then sends the angle information to the aircraft by way of the mod/demod 904, RF interface 906, and antenna 908. In the case of an E-OTD triangulation system, the processor 910 may be configured to broadcast burst signals via the mod/demod 904, RF interface 906 and antenna 908. An emergency-calling MU uses the burst signals from three or more PDEs to determine its own location. Using the timing information, the emergency-calling MU determines it own approximate location, and subsequently sends the location information back to the PDE 900 for subsequent transmission to the aircraft via, for example, a voice communication link.

Figure 10:
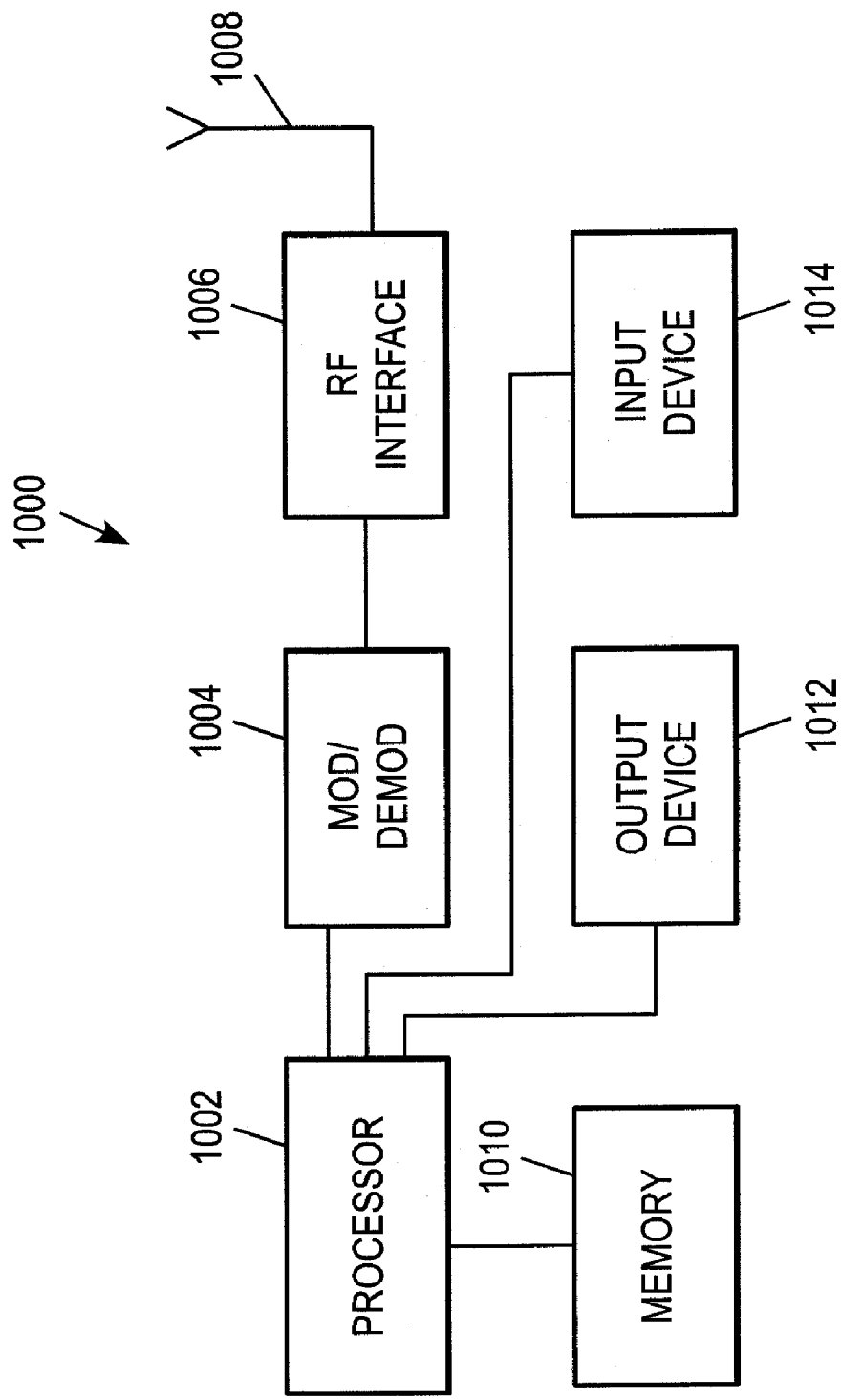
FIG. 10 illustrates a block diagram of an exemplary wireless mobile positioning center (MPC) in accordance with another embodiment of the invention.

FIG. 10 illustrates a block diagram of an exemplary wireless mobile positioning center (MPC) 1000 in accordance with another embodiment of the invention. The wireless MPC 1000 may be an exemplary detailed version of the wireless MPC 802 of wireless communication system 800 described above. The wireless MPC 1000 comprises a processor 1002, a mod/demod 1004, an RF interface 1006, an antenna 1008, a memory 1010, an output device 1012, and an input device 1014.

The antenna 1008 provides an interface between a wireless transmission medium and a wired transmission medium. The RF interface 1006 conditions an outgoing signal for transmission via the wireless medium and conditions an incoming signal for demodulating by the mod/demod 1004. The mod/demod 1004 modulates a carrier with an outgoing signal and removes the carrier from an incoming signal. The processor 1002 controls the various operations of the MPC 1000. The memory 1010, serving generally as a computer readable medium, stores data and one or more software modules adapted to control the processor 1002 in performing its various operations. The output device 1012 (e.g., a display and/or speaker) produces visual and/or audio information for a user of the MPC 1000. The input device 1014 (e.g., keyboard, pointing device, microphone, etc.) receives information from the user of the MPC 1000.

In operation, after the wireless PDEs have been deployed throughout the search and rescue area, the processor 1002 receives information related to the respective locations of the PDEs via the antenna 1008, RF interface 1006, and mod/demod 1004. After a user initiates an emergency call using his/her MU, the processor 1002 receives time stamp information respectively from the deployed PDEs via the antenna 1008, RF interface 1006, and processor 1002. Using a triangulation algorithm, the processor 1002 determines the approximate location of the emergency-calling MU. The processor 1002 then informs the user of the MPC 1000 via the output device 1012. If the MPC 1000 is capable of establishing a voice communication link with one of the deployed PDE, the processor 1002 may receive voice communications from the user of the MPC 1000 via the input device 1014 and send the voice communications to the emergency-calling MU via the mod/demod 1004, RF interface 1006, antenna 1008, and deployed PDE. The processor 1002 may also receive voice communications from the emergency-calling MU via the deployed PDE, antenna 1008, RF interface 1006, and demod 1004, and provide them to the user of the MPC 1000 via the output device 1012.

In the case of an AOA triangulation system, the processor 1002 receives angle of arrival information from three or more wireless PDEs by way of the antenna 1008, RF interface 1006, and mod/demod 1004. Using the angle information, the processor 1002 determines the approximate location of the emergency-calling MU and provides such information to the user by way of the output device 1012. In the case of an E-OTD triangulation system, the processor 1002 receives the approximate location information from a wireless PDE via, for example, a voice communication link.

Figure 11A:
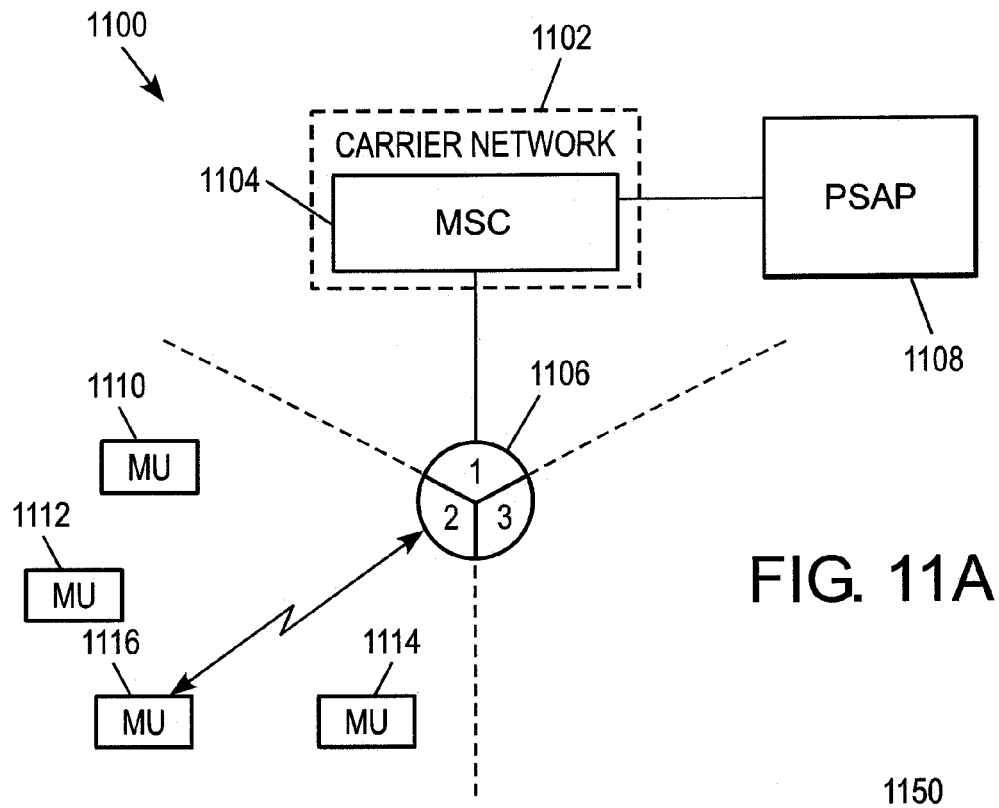
FIG. 11A illustrates a block diagram of another exemplary wireless. communication system in accordance with another embodiment of the invention.

FIG. 11A illustrates a block diagram of another exemplary wireless communication system 1100 in accordance with another embodiment of the invention. In summary, the wireless communication system 1100 assists a GPS-capable, emergency-calling MU in determining its present location in a much shorter time period. The wireless communication system 1100 perform this by determining which set of GPS satellites signals are appropriate for the emergency-calling MU to use in determining its present location, based on prior history of emergency calls made from other MUs within the same sector used by the emergency-calling MU.

In a "cold start", a GPS receiver takes considerable amount of time to determine its present location. First, it has to determine which satellite signals to use in arriving at the location information. The GPS receiver receives the GPS satellites signals containing unique codes identifying the corresponding satellites, and correlates those codes with 24 predetermined codes to separate and uniquely identify the satellite signals. Once the identity of the satellites are known, the GPS receiver uses the time of arrival information associated with each of the satellite signals to determine its present location. The operation of identifying the received satellite signals is typically very time consuming.

In the wireless communication system 1100, the MSC 1104 assists the emergency-calling MU in identifying the satellites signals it is capable of receiving. The MSC 1104 performs this by accessing and examining historical information related to the locations of prior emergency-calling MUs within the same sector used by the emergency-calling MU. For example, MUs 1110, 1112, and 1114 have previously made emergency calls from locations within the area covered by sector 2 of base station 1106. During such calls, the MSC 1104 received information related to the locations of the MUs 1110, 1112, and 1114, for example, 32.33.56, 32.33.01, and 32.31.54, respectively. Based on these locations, the MSC 1104 has stored information related to a set of GPS satellites whose signals may be received from locations within the area covered by sector 2 of base station 1106.

Thus, when the MSC 1104 receives the emergency call from an MU 1116, it access the information related to the set of GPS satellites whose signals may be received within the area covered by sector 2 of the base station 1106, and sends this information to the calling MU 1116. Instead of determining which GPS satellites signals it is receiving, the GPS receiver of the calling MU 1116 uses the GPS satellite information received from the MSC 1104 to separate satellite signals. Once the satellite signals are separate, their respective time of arrival information is deduced, and the present location of the emergency-calling MU 1116 is determined. Once the present location information is determined, the emergency-calling MU 116 sends the information back to the MSC 1104, which, in turn, relays the information to the PSAP 1108. This technique is further explained in the following example.

Figure 11B:
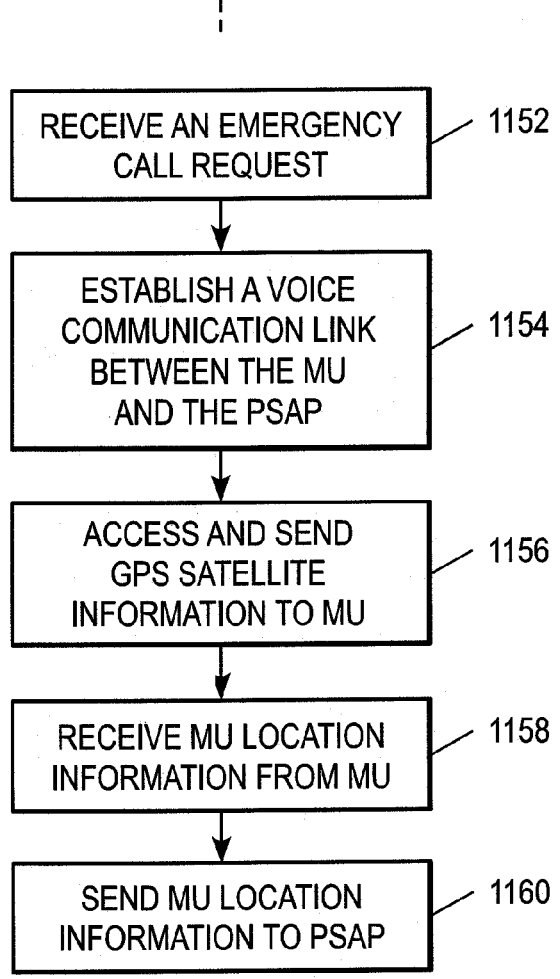
FIG. 11B illustrates a flow diagram of an exemplary method of processing an emergency call request in accordance with another embodiment of the invention.

FIG. 11B illustrates a flow diagram of an exemplary method 1150 of processing an emergency call request in accordance with another embodiment of the invention. According to the method 1150, the MSC 1104 receives an emergency call request from an emergency-calling MU 1116 (block 1152). The emergency call request contains information related to the base station 1106 and sector 2 used by the MU 1116 in sending the request to the MSC 1104. In response to the emergency-call request, the MSC 1104 establishes a voice communication link between the emergency-calling MU 1116 and the PSAP 1108 (block 1154).

Using the information related to the base station 1106 and sector 2 associated with the call, the MSC 1104 accesses a look-up table stored in a local memory to retrieve information related to a set of GPS satellites whose signals can be received within the area covered by sector 2 of base station 1106, and sends the information to the emergency-calling MU 1116 (block 1156). Using such information, the emergency-calling MU 1116 determines its present location and sends it to the MSC 1104 (block 1158). The MSC 1104 then sends the information related to the present location of the emergency-calling MU 1116 to the PSAP 1108 (block 1160).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising:
    a plurality of position determining equipment (PDE) to generate time stamp information associated with a received emergency call request from an emergency-calling mobile unit (MU), and transmit said time stamp information via a wireless medium, wherein at least one of the position determining equipment transmits said time stamp information while descending to the ground; and
    a mobile positioning center (MPC) adapted to receive said time stamp information from said plurality of position determining equipment by way of said wireless medium, and determine an approximate location of said emergency-calling mobile unit (MU) from said time stamp information.

2. The wireless communication system of claim 1, wherein said mobile positioning center (MPC) is deployed on an aircraft.

3. The wireless communication system of claim 2, wherein said aircraft comprises a helicopter or an airplane.

4. The wireless communication system of claim 1, wherein at least one of said position determining equipment comprises a deployable parachute.

5. The wireless communication system of claim 1, wherein at least one of said position determining equipment is incorporated into a housing made of a material of sufficient strength to protect the position determining equipment from ground impact from at least a parachute-assisted descent.

6. The wireless communication system of claim 5, wherein said housing includes indicia that provide instruction to a user of said emergency-calling mobile unit (MU).

7. The wireless communication system of claim 1, wherein at least one of said position determining equipment comprises an alerting device.

8. The system of claim 1, wherein the at least one of the position determining equipment is adapted to transmit a signal to elicit a response from the mobile unit while descending to the ground.

9. The system of claim 8, wherein the signal is a paging message or re-registration message.

10. A wireless communication system. comprising:
    a plurality of position determining equipment (PDE) to generate time stamp information associated with a received emergency call request from an emergency-calling mobile unit (MU), and transmit said time stamp information via a wireless medium, wherein at least one of said position determining equipment comprises an alerting device; and
    a mobile positioning center (MPC) adapted to receive said time stamp information from said plurality of position determining equipment by way of said wireless medium, and determine an approximate location of said emergency-calling mobile unit (MU) from said time stamp information, wherein said alerting device comprises any one or more of the following:
    a sound-emitting device;
    a light-emitting device; and/or
    a smoke-emitting device.

11. A wireless communication system, comprising:
    a plurality of position determining equipment (PDE) adapted to generate information associated with a received emergency call request from an emergency-calling mobile unit (MU), and transmit information via a wireless medium, wherein at least one of the position determining equipment transmits said information while descending to the ground; and
    a mobile positioning center (MPC) adapted to receive said information from said plurality of position determining equipment (PDE) by way of said wireless medium, and determine an approximate location of said emergency-calling mobile unit (MU) from said information.

12. The wireless communication system of claim 11, wherein said information relates to a time of arrival of said emergency call request at each of said-plurality of position determining equipment (PDE).

13. The wireless communication system of claim 11, wherein said information relates to an angle of arrival of said emergency call request at each of said plurality of position determining equipment (PDE).

14. The system of claim 11, wherein the at least one of the position determining equipment is adapted to transmit a signal to elicit a response from the mobile unit while descending to the ground.

15. The system of claim 14, wherein the signal is a paging message or re-registration message.

16. A position determining equipment, comprising:
    an antenna;
    a radio frequency (RF) interface coupled to said antenna; and
    a time stamp module adapted to generate time information associated with a receipt of an emergency call request received from an emergency-calling mobile unit (MU) by way of said antenna and said RF interface, wherein the position determining equipment is adapted to transmit said time stamp information while descending to the ground.

17. The position determining equipment of claim 16, further comprising a demodulator to demodulate a received signal carrying said emergency call request.

18. The position determining equipment of claim 16, further comprising an alerting device.

19. The position determining equipment of claim 16, further comprising a parachute deployment unit.

20. The position determining equipment of claim 16, further comprising a processor adapted to send said time information to a mobile positioning center (MPC) by way of said RF interface and said antenna.

21. The position determining equipment of claim 16, further comprising a processor adapted to establish a first voice communication link to said emergency-calling mobile unit (MU).

22. The position determining equipment of claim 21, further comprising a computer readable medium for storing a pre-recorded message, and wherein said processor is adapted to send said pre-recorded message to said emergency-calling mobile unit (MU) by way of said first voice communication link.

23. The position determining equipment of claim 22, wherein said processor is adapted to establish a second voice communication link to a mobile positioning center (MPC), wherein said processor is adapted to receive first voice communications from said emergency-calling mobile unit (MU) by way of said first voice communication link and send said first voice communications to said mobile positioning center (MPC) by way of said second voice communication link, and wherein said processor is adapted to receive second voice communications from said mobile positioning center (MPC) by way of said second voice communication link and send said second voice communications to said emergency-calling mobile unit (MU) by way of said first voice communication link.

24. The position determining equipment of claim 16, further comprising: a global positioning system (GPS) receiver to determine location information associated with the position determining equipment; and a processor adapted to transmit said location information by way of said RF interface and antenna.

25. The position determining equipment of claim 16, wherein the position determining equipment is adapted to transmit a signal to elicit a response from the mobile unit while descending to the ground.

26. The system of claim 25, wherein the signal is a paging message or re-registration message.

27. A position determining equipment comprising:

an antenna;

a radio frequency (RF) interface coupled to said antenna;

a time stamp module adapted to generate time information associated with a receipt of an emergency call request received from an emergency-calling mobile unit (MU) by way of said antenna and said RF interface; and an alerting device that comprises any one or more of the following:

a sound-emitting device;

a light-emitting device; and/or a smoke-emitting device.

28. A position determining equipment, comprising:

an antenna;

a radio frequency (RF) interface coupled to said antenna; and a module adapted to generate information associated with a receipt of an emergency call request received from an emergency-calling mobile unit (MU) by way of said antenna and said RF interface, wherein said information is used to determine an approximate location of said emergency-calling mobile unit (MU), and wherein the position determining equipment is adapted to transmit said information while descending to the ground.

29. The position determining equipment of claim 28, wherein said information relates to an angle of arrival of a signal carrying said emergency call request.

30. The position determining equipment of claim 28, wherein the position determining equipment is adapted to transmit a signal to elicit a response from the mobile unit while descending to the ground.

31. The position determining equipment of claim 30, wherein the signal is a paging message or re-registration message.

* * * * *